United States Patent
Chowdhury et al.

(10) Patent No.: US 7,454,144 B2
(45) Date of Patent: *Nov. 18, 2008

(54) LOW TOTAL EXCURSION DISPERSION MAPS

(75) Inventors: Aref Chowdhury, Springfield, NJ (US); Rene'-Jean Essiambre, Red Bank, NJ (US); Lisa Kathleen Wickham, Ithaca, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/844,940

(22) Filed: Aug. 24, 2007

(65) Prior Publication Data

US 2007/0286607 A1 Dec. 13, 2007

Related U.S. Application Data (63) Continuation of application No. 10/729,153, filed on Dec. 5, 2003, now Pat. No. 7,280,765.

(51) Int. Cl.
*H04B 10/00* (2006.01)
(52) U.S. Cl. ............... 398/148; 398/142; 398/159; 398/147
(58) Field of Classification Search ............ 398/157, 398/140–150, 158–161, 173–181
See application file for complete search history.

(56) References Cited

U.S. PATENT DOCUMENTS

| | | |
|---|---|---|
| 5,365,362 A | 11/1994 | Gnauck et al. |
| 5,532,868 A | 7/1996 | Gnauck et al. |
| 5,606,445 A | 2/1997 | Kikuchi et al. |
| 5,629,795 A | 5/1997 | Suzuki et al. |
| 5,777,770 A | 7/1998 | Naito |
| 5,798,853 A | 8/1998 | Watanabe |
| 6,128,118 A | 10/2000 | Marcenac |

(Continued)

OTHER PUBLICATIONS

Gnauck, A.H., et al.; "2.5 Tb/s (64×42.7 Gb/s) Transmission Over 40×100 km NZDSF using RZ-DPSK Format and All-Raman-Amplified Spans"; OFC 2002 Postdeadline Papers; pp. FC2-1-FC2-3.

(Continued)

*Primary Examiner*—Agustin Bello
(74) *Attorney, Agent, or Firm*—John F. McCabe; J. Joel Justiss (57) ABSTRACT

A process optically transports digital data over an all-optical long-haul communication path. The process includes transporting digital optical data signals at a selected bit rate and a selected wavelength over a sequence of transmission spans. The sequence includes 70 percent or more of the spans of the long-haul all-optical communication path. Each span of the sequence has a primary local maximum optical power point for the wavelength on a transmission fiber and nearest to an input of the span. The transporting causes a cumulative dispersion of each signal to evolve such that residual dispersions per span are positive over some of the spans and are negative over other of the spans. At the primary local maximum power points, magnitudes of cumulative dispersions of the signals in pico seconds per nanometer remain at less than 32,000 times the inverse of the bit rate in giga bits per second.

15 Claims, 6 Drawing Sheets

U.S. PATENT DOCUMENTS

| | | | |
|---|---|---|---|
| 6,160,942 | A | 12/2000 | Watanabe |
| 6,204,949 | B1 | 3/2001 | Ishikawa et al. |
| 6,292,602 | B1 | 9/2001 | Suzuki |
| 6,324,317 | B1 | 11/2001 | Tanaka et al. |
| 6,486,989 | B2 | 11/2002 | Shinoda |
| 6,504,972 | B2 | 1/2003 | Watanabe |
| 6,542,678 | B2 | 4/2003 | Essiambre et al. |
| 6,583,907 | B1 | 6/2003 | Essiambre |
| 6,606,176 | B1 | 8/2003 | Essiambre et al. |
| 6,626,592 | B2 | 9/2003 | Watanabe |
| 6,665,113 | B2 | 12/2003 | Aso et al. |
| 6,704,519 | B1 | 3/2004 | Brener et al. |
| 6,724,997 | B2 | 4/2004 | Oksanen |
| 6,744,553 | B1 | 6/2004 | Islam et al. |
| 6,751,421 | B1 | 6/2004 | Ranka et al. |
| 6,771,853 | B2 | 8/2004 | Watanabe |
| 6,792,214 | B1 | 9/2004 | Essiambre et al. |
| 6,832,051 | B2 | 12/2004 | Lu et al. |
| 6,943,935 | B2 | 9/2005 | Bickham et al. |
| 6,963,675 | B2 | 11/2005 | Watanabe |
| 7,016,583 | B2 | 3/2006 | Downie et al. |
| 7,027,740 | B2 | 4/2006 | Essiambre et al. |
| 7,068,938 | B1 | 6/2006 | Islam et al. |
| 2002/0131160 | A1 | 9/2002 | McNicol |
| 2002/0141715 | A1 | 10/2002 | Essiambre et al. |
| 2003/0072513 | A1 | 4/2003 | Glingener et al. |
| 2004/0234272 | A1 | 11/2004 | Chowdhury et al. |
| 2004/0234275 | A1 | 11/2004 | Chowdhury et al. |
| 2005/0123304 | A1 | 6/2005 | Lehmann et al. |

OTHER PUBLICATIONS

Brener, I., et al.; "Cancellation of all Kerr nonlinearities in long fiber spans using a LiNbO3 phase conjugator and Raman amplification"; Optical Fiber Communication Conference 2000, Postdeadline Papers; 266/PD33-1-268/PD33-3.

Essiambre, Rene-Jean, et al.; "Design of Bidirectionally Pumped Fiber Amplifiers Generating Double Rayleigh Backscattering"; 2002 IEEE Photonics Technology letters, vol. 14, No. 7, Jul. 2002; pp. 914-916.

Smith, Nicholas J., et al.; "Soliton Transmission Using Periodic Dispersion Compensation"; 1997 IEEE Journal of Lightwave Technology, vol. 15, No. 10, Oct. 1997; pp. 1808-1822.

Sugahara, Hiro, et al.; "6,050km transmission of 32×42.7 Gb/s DWDM signals using Raman-amplified quadruple-hybrid span configuration"; OFC 2002 Postdeadline Papers (2002); pp. FC6-1-FC6-2.

Griffin, R.A., et al.; "10 Gb/s Optical Differential Quadrature Phase Shift Key (DQPSK) Transmission using GaAs/AlGaAs Integration"; OFC 2002 Postdealine Paper (2002); pp. FD6-1-FD6-3.

Killey, R.I. et al.; "Reduction of Intrachannel Nonlinear Distortion in 40-Gb/s-Based WDM Transmission over Standard Fiber"; 2000 IEEE Photonics Technology Letters, vol. 12, No. 12, Dec. 2000; pp. 1624-1626.

LOW TOTAL EXCURSION DISPERSION MAPS

CROSS REFERENCE TO RELATED APPLICATION

This application is a continuation of U.S. patent application Ser. No. 10/729,153, entitled "LOW TOTAL EXCURSION DISPERSION MAPS," filed on Dec. 5, 2003 now U.S. Pat. No. 7,280,765, by Aref Chowdhury, et al. The above-listed application is commonly assigned with the present invention and is incorporated herein by reference as if reproduced herein in its entirety.

FIELD OF THE INVENTION

The invention relates to optical communication systems and processes.

DISCUSSION OF THE RELATED ART

In optical communications systems, transmission optical fibers cause chromatic dispersion and nonlinear optical effects. Both effects degrade optical pulses in ways that increase transmission errors. To reduce the pulse degradation caused by chromatic dispersion, optical communication systems typically incorporate dispersion compensation devices, e.g., dispersion compensating fibers (DCFs), dispersion compensating interferometers, or dispersion compensating grating systems, to compensate for chromatic dispersion. To reduce the pulse degradation caused by nonlinear optical effects, long-haul optical communication systems typically manage dispersion through special processes and special dispersion maps.

The special processes involve transmitting optical pulses over transmission spans in a pseudo-linear transmission regime (PLTR). The PLTR is defined by the following operating conditions: a bit rate of 10 Giga bits per second (Gb/s) or higher, a wavelength of 1.25 micrometers (μm) to 1.7 μm, a pulse full width at half maximum power of 60 ps or less, and a pulse duty cycle of between 10% and 70%. The transmission spans are typically single mode optical fibers with high magnitude of the dispersions that are about +2 pico seconds (ps) or more per nanometer (nm) per kilometer (km) at communication wavelengths. Due to this high dispersion, the transmission spans cause substantial broadening of optical pulses. In the PLTR, this pulse broadening causes multiple optical pulses from nearby frequency channels to substantially overlap in time, which averages inter-pulse interactions and reduces pulse distortion from inter-channel interactions.

The special dispersion maps result from chromatic dispersion compensation devices that are located at the input and/or output ends of transmission spans. Herein, a dispersion map plots the cumulative dispersion as a function of transmission distance along an optical communication path. The dispersion compensation devices at the input and/or output ends of transmission spans produce abrupt changes in cumulative dispersion along the communication path thereby producing nontrivial dispersion maps.

Figure 1:
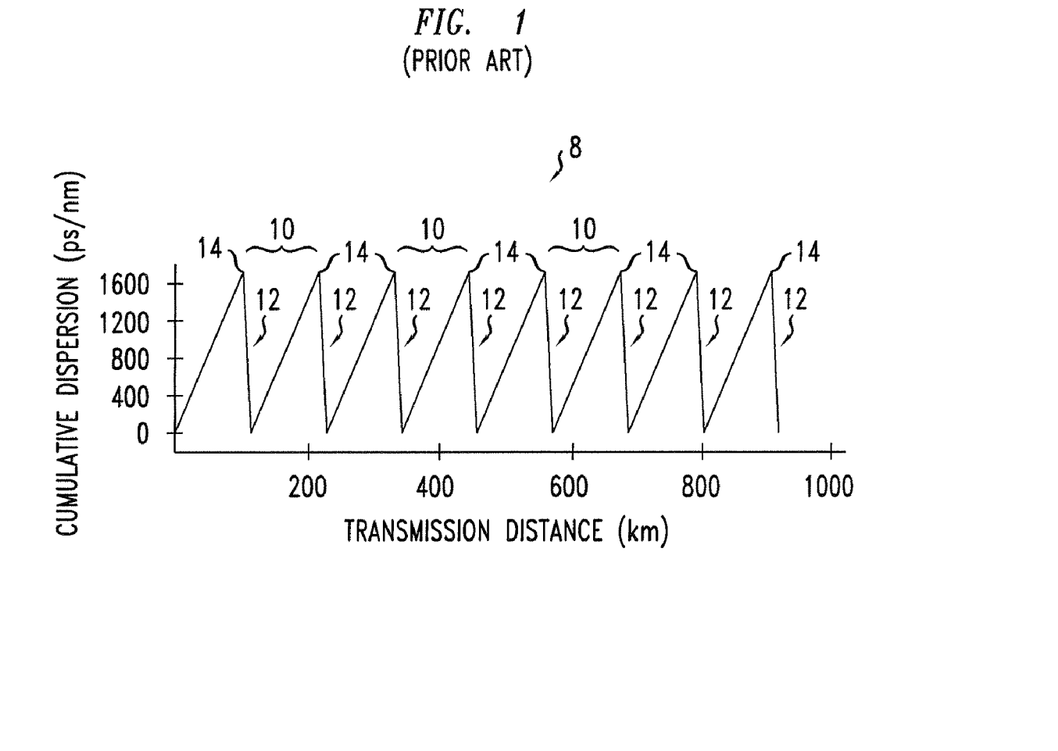
FIG. 1 shows a conventional full-span compensation dispersion map in which the residual dispersion per span is zero.

FIG. 1 shows a dispersion map 8 of an optical communication path with eight identical transmission spans. Each transmission span includes 100 km of positive dispersion single mode fiber (SMF) 10. Between the ends of the SMFs 10 of adjacent transmission spans is a DCF 12. Along each transmission SMF 10, the cumulative dispersion increases linearly with distance. Along each DCF 12, the cumulative dispersion decreases linearly with distance. The lengths of the DCFs 12 are selected to produce full compensation of the dispersion 14 that accumulated on the preceding transmission SMF 10. This full compensation of chromatic dispersion produces a dispersion map in which the cumulative dispersion is periodic in a span-by-span manner. This dispersion map is referred to as a full-span compensation map.

While full-span compensation maps do compensate very well for the pulse degradation caused by chromatic dispersion, these maps do not completely correct for the pulse degradation caused by nonlinear optical effects. In particular, the span-by-span periodicity suggests that any residual pulse degradation from nonlinear optical effects will add constructively with the number of spans as a pulse travels along the optical communication path. In long haul communication systems, this constructive accumulation of nonlinear distortions can be the primary contribution to the bit error rate (BER) and pulse degradation.

Figure 2:
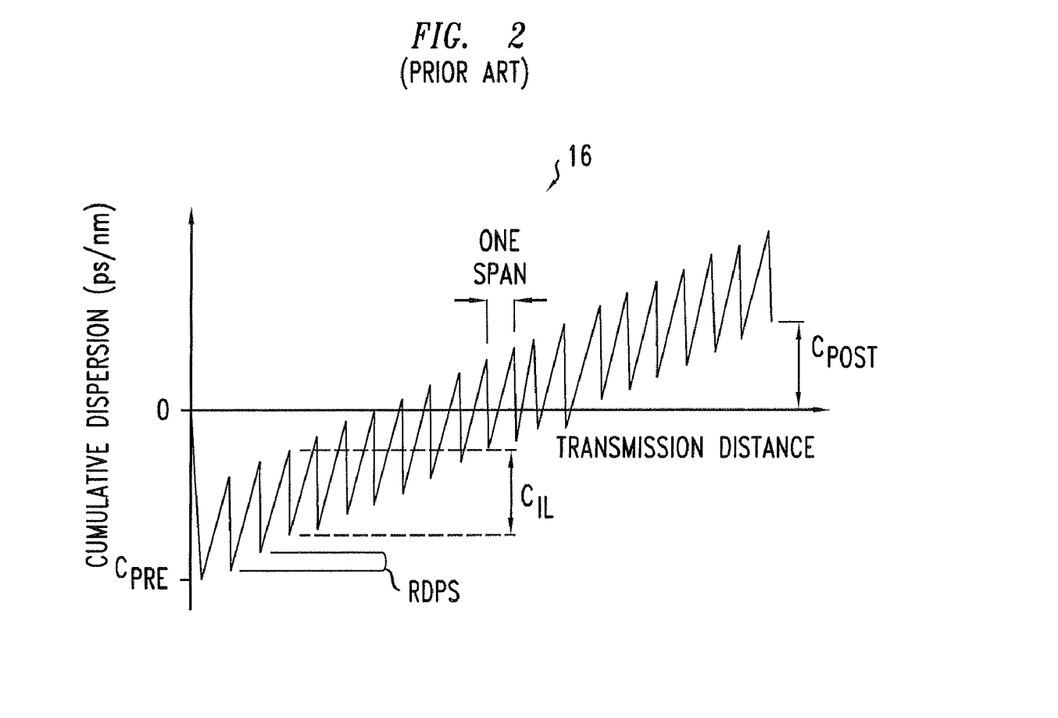
FIG. 2 shows a conventional singly periodic dispersion map in which the residual dispersion per span is nonzero and constant over the optical communication path.

FIG. 2 shows a dispersion map 16 for an optical communication system that includes a series of identical transmission spans of positive dispersion SMF, a DCF located after each transmission span, a pre-transmission dispersion compensator, and a post-transmission dispersion compensator. The dispersion map 16 provides pre-transmission dispersion compensation, $C_{PRE}$, prior to the first span, in-line dispersion compensation, $C_{IL}$, after each transmission span, and post-transmission dispersion compensation, $C_{POST}$, after the last transmission span. In the dispersion map 16, the in-line dispersion compensation, $C_{IL}$, does not entirely compensate for the positive dispersion that accumulates in the preceding transmission span of positive dispersion SMF. Instead, a residual dispersion per span, $C_{RDPS}$, remains after the in-line dispersion compensation for each span. A nonzero and constant value of $C_{RDPS}$, as e.g., in the map 16, produces a dispersion map that is referred to as a singly periodic map. If the value of $C_{RDPS}$ is the same and zero for each span as, e.g., in FIG. 1, the dispersion map is referred to as a full-span compensation map.

Some special dispersion maps better compensate for the pulse degradation caused by nonlinear optical effects. In particular, it is believed that optimal values of $C_{PRE}$ exist for singly periodic dispersion maps that are EDFA pumped. For such maps, the approximately optimal $C_{PRE}$ is believed to satisfy:

$$C_{PRE} = -NC_{RDPS}/2 + (D/\alpha)ln([1-\exp(-\alpha L_{span})]/2)$$

Here, α is the power loss per unit length in a transmission span, N is the total number of spans, D is the dispersion in optical fibers of the transmission spans, and $L_{span}$ is the length of each span. The above equation defines $C_{PRE}$ in terms of $C_{RDPS}$ when the physical parameters of the transmission spans, i.e., $L_{span}$, D, and α, are given. A singly periodic map that satisfies the above optimization equation will compensate well for the effects of intra-channel cross-phase modulation and intra-channel four-wave mixing.

Among dispersion maps that satisfy the above optimization equation, singly periodic maps with small $C_{RDPS}$'s seem to produce large amounts of timing jitter in transmitted optical pulses. Normally, large amounts of timing jitter are not desirable, because timing jitter can cause reception errors.

Various nontrivial dispersion maps are described in U.S. Pat. No. 6,583,907 issued Jun. 24, 2003; U.S. Pat. No. 6,606,176 issued Aug. 12, 1999; and U.S. patent application Ser. No. 10/152,645, filed May 21, 2002 by R.-J. Essiambre et al all of which are incorporated herein by reference in their entirety. While special dispersion maps have reduced the amount of pulse degradation from nonlinear optical effects, processes for further reducing such pulse degradation are desirable. Such processes could enable higher bit rates and/or higher power levels that allow optical transmission of data over longer distances.

BRIEF SUMMARY

The various embodiments relate to long-haul all-optical transmission systems and processes that produce low total excursion. These maps reduce pulse degradation from non-linear optical effects when transmission is performed in the pseudo-linear transmission regime (PLTR) over long haul distances. The new optical transmission systems and processes open potentials for optically transmitting data at higher bit rates and/or higher power levels that enable optical transmission of data over longer distances.

In one aspect, a process optically transports digital data over a long-haul all-optical communication path. The process includes transporting digital optical data signals, e.g., optical pulses, at a selected bit rate and wavelength over a consecutive or non-consecutive sequence of transmission spans. The sequence includes 70 percent or more of the spans of the long-haul all-optical communication path. Each span of the sequence is configured to have one or more local maximum optical power points for the selected wavelength on a transmission fiber thereof. The transporting step causes a cumulative dispersion of each transported digital optical data signal to evolve along a dispersion map of the path. The map is such that residual dispersions per span over some ones of the spans are positive at the selected wavelength and over other ones of the spans are negative at the selected wavelength. For each span, a primary local maximum power point at the selected wavelength is the local maximum power point located nearest to a signal input in the associated fiber. At the primary local maximum power point of each span of the sequence, magnitudes of cumulative dispersions of the optical data signals in pico seconds per nanometer are less than 32,000 times the inverse of the bit rate in giga bits per second.

In another aspect, a long-haul all-optical communication system for transmitting digital optical data signals, e.g., optical pulses, at a selected bit rate and a selected wavelength includes a consecutive or non-consecutive sequence of optical transmission spans. The spans of the sequence form at least 70 percent of the spans of the long-haul all-optical communication path. Each span of the sequence has in the path a transmission single-mode optical fiber, an optical amplifier, and a dispersion compensator. The path causes cumulative dispersions of digital optical data signals to evolve over a dispersion map such that residual dispersions per span are positive over some of the spans for the selected wavelength and are negative over others of the spans for the selected wavelength. The path is configured to produce one or more local maximum optical power points in each transmission optical fiber. For the selected wavelength, the local maximum power point nearest to the signal input of one of the fibers is the primary local maximum power point of the associated span. The path is configured such that at the primary local maximum power points of the spans in the sequence, magnitudes of cumulative dispersions of the digital optical data signals in pico seconds per nanometer are less than 32,000 times the inverse of the bit rate in giga bits per second.

BRIEF DESCRIPTION OF THE DRAWINGS

In the Figures and text, like reference numerals indicate elements with similar functions.

DETAILED DESCRIPTION

Herein, a long haul, all-optical communication path includes a series of transmission spans whose combined length is more than about 1,000 kilometers. In such a path, the series of transmission spans may be 2,000 kilometers long or longer.

Figure 3A:
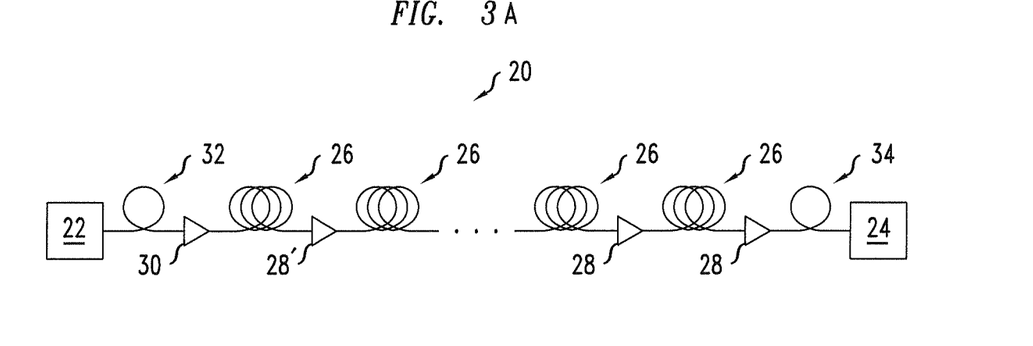
FIG. 3A shows an optical communication path.

FIG. 3A shows a long haul, all-optical, communication path 20 that connects an optical transmitter 22, which encodes digital data into a stream of digital optical data signals, to an optical receiver 24, which extracts digital data from such streams of digital optical data signals. The stream of digital data may encode the data as a stream of optical pulses or as a stream of phase modulations on an optical carrier and may encode the data in an optical return-to-zero (RZ) format or an optical non-return-to-zero (NRZ) format. The optical communication path 20 includes the optical transmission spans 26 and in-line optical amplifiers 28, which are disposed between adjacent pairs of the optical transmission spans 26. Each optical transmission span 26 includes a single mode, optical fiber (SMF) for transmitting optical signals. The transmission SMFs are typically non-hybrid single mode optical fibers with dispersions whose magnitudes are at least 2 ps per nm per km. The dispersion is substantially constant along a transmission fiber's length. In embodiments described below, the transmission spans 26 use positive dispersion SMFs (PDSMFs) as transmission fibers, but embodiments where the transmission spans 26 use negative dispersion SMFs (NDSMFs) are also in the scope of the invention. Exemplary transmission PDSMFs include standard single mode optical fibers, dispersion shifted single mode optical fibers, and various single mode optical fibers available under the True-Wave® product names from OFS Corporation of Norcross, Ga. USA and Copenhagen, Denmark. Typically, each transmission SMF is 50 km or more long, preferably is about 80 km or longer, and more preferably is between 80 km and 120 km long. Each in-line optical amplifier 28 is a lumped device that produces both optical amplification and in-line dispersion compensation.

Figure 4:
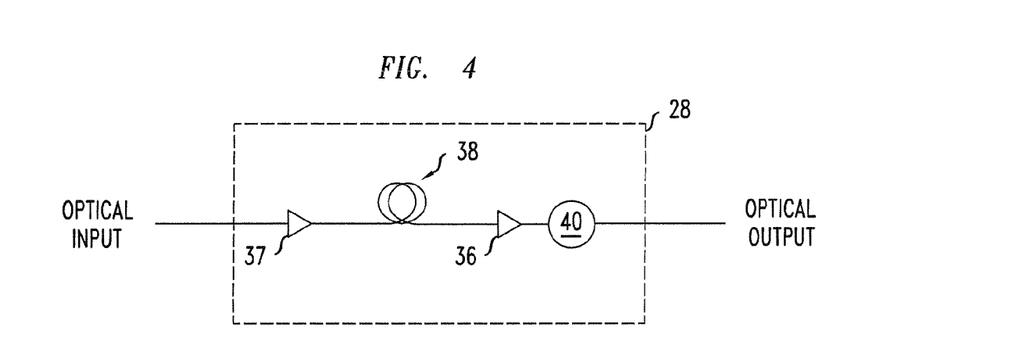
FIG. 4 shows an in-line amplifier of the optical communication path of FIG. 3A.

FIG. 4 shows one in-line optical amplifier 28 of the long haul all-optical communication path 20 of FIG. 3A. The in-line optical amplifier 28 includes optical amplifier stages 36, 37; a DCF 38; and other optical components 40. Exemplary optical amplifier stages 36, 37 include rare earth doped amplifiers, e.g., erbium doped fiber amplifiers (EDFAs), and/or Raman amplifiers. For embodiments where the transmission spans 26 are PDSMFs, the DCF 38 is a single-mode optical fiber, which has a negative dispersion. For spans 26 of PDSMF, exemplary DCFs 38 have dispersions of about −85 ps/nm. For embodiments where the transmission spans 26 are NDSMFS, the DCFs 38 have positive dispersions. In exemplary in-line optical amplifiers 28, the amplifier stage 37 is often designed so that the DCF 38 operates at a much lower power than high power portions of the transmission spans 26. For that reason, nonlinear optical effects are often negligible in the DCF 38. Exemplary optical components 40 include optical add/drop devices, optical multiplexers, optical demultiplexers, etc.

The optical communication path 20 incorporates pre-transmission, post-transmission, and in-line dispersion compensation to produce dispersion mapping. The pre-transmission dispersion compensation, $C_{PRE}$, is produced by a dispersion compensator 32, e.g., a DCF, located before the optical amplifier 30 of the transmitter 22. The negative or positive post-transmission dispersion compensation, $C_{POST}$, is produced by a dispersion compensator 34, e.g., a DCF or a section of standard SMF depending on the sign of $C_{POST}$. The dispersion compensator 34 is located between the last in-line optical amplifier 28 of the optical communication path 20 and the optical receiver 24. The in-line dispersion compensation, $C_{IL}$, is produced by the DCFs 38 that are located in the in-line amplifiers 28. In the long-haul all-optical communication optical path 20, the configuration of the dispersion compensators 32, 38, 34 can produce dispersion maps of the types shown in FIGS. 6-8.

In some embodiments, the long-haul all-optical communication path 20 has a $C_{PRE}$ that is selected to optimally suppress nonlinear signal distortions over the length of the optical communication path 20. Methods for selecting such an optimal $C_{PRE}$, are, e.g., described in U.S. patent application Ser. No. 10/152,645 ('645), filed by Rene'-Jean Essiambre and Lisa Wickham on May 21, 2002. Said '645 patent application is incorporated herein by reference in its entirety.

Figure 3B:
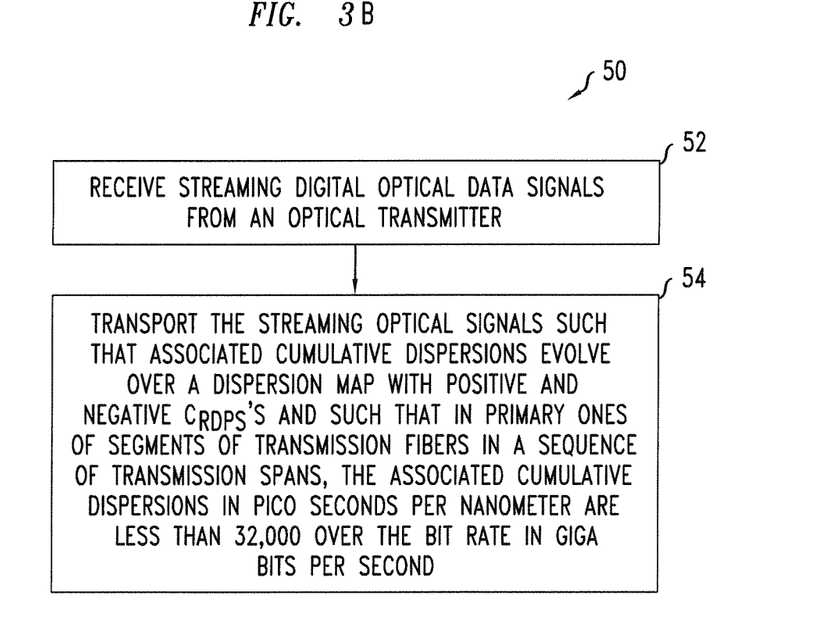
FIG. 3B is a flow chart illustrating a process for operating the optical communication path of FIG. 3A.

In some embodiments of the long-haul all-optical, communication path 20 with a doubly periodic dispersion map and transmission spans 26 of PDSMF, the pre-transmission dispersion compensation, $C_{PRE}$, may be such that $C_{PRE}$=−N $\underline{C_{RDPS}}/2+(D/\alpha)\ln([1-\exp(-\alpha L_{span})]/2)\pm 20\%$ or preferably ±5%. Here, $\alpha$, D, and $L_{span}$ are the average power loss per unit length in the PDSMFs of the transmission spans 26, the average dispersion in the PDSMFs of the transmission spans 26, and the average length of the PDSMFs of the transmission spans 26 of the path 20, respectively. N is the number of transmission spans 26 in a macro-period or repeat unit of the doubly periodic map. $\underline{C_{RDPS}}$ is the residual dispersion per span averaged over the transmission spans 26 of the optical communication path 20. FIG. 3B illustrates a process 50 for operating the long haul all-optical communication path 20 of FIG. 3A. The process 50 includes receiving streaming digital optical data signals, e.g., optical pulses, from optical transmitter 22 (step 52). The process 50 includes optically transporting the streaming digital optical data signals over a sequence of transmission spans of the all-optical communication path 20 (step 54). Herein, the expression "a sequence of spans" is meant to encompass either a sequence of consecutive spans in the associated communication path or a sequence of non-consecutive spans of the associated communication path. The sequence includes 70 percent or more of the spans of the all-optical long-haul communication path 20 and may include 80 percent or more of the spans, 90 percent or more of the spans, or even all the spans of the path 20. The transporting step 54 transmits the streaming digital optical data to receiver 24 at the selected bit rate and wavelength of the transmitter 22 via transmission spans 26 of SMF. For the selected wavelength, each span 26 has during operation one or more local maximum optical power points on the transmission fiber thereof. For the selected wavelength, a primary local maximum power point of a given transmission span 26 is the local maximum power point located nearest to the signal input in the SMF of the given transmission span 26. The transporting step 54 causes cumulative dispersions of the transported optical data signals, e.g., optical pulses, to evolve along a dispersion map of the path 20. The dispersion map is such that residual dispersions per span are positive over some ones of the spans 26 of SMF in the sequence at the selected wavelength and such that residual dispersions per span are negative over other ones of the spans 26 of SMF in the sequence at the selected wavelength. For example, the map may be a doubly periodic map or a map of non-definite periodicity. During operation, each SMF of a transmission span 26 in the sequence has one or more segments (HPS) where a time-averaged optical power at the selected wavelength is at least 0.2 times the largest value of a time-averaged optical power at the wavelength along the same SMF. For the selected wavelength, on the primary one of the above segments, an integral of a time-averaged optical power along the length thereof is greater than or equal to an integral of the optical power along any other one of the above segments for the same fiber. In said primary ones of the segments of the fibers in the sequence, magnitudes of cumulative dispersions of the optical data signals in pico seconds per nanometer remain less than 32,000 times the inverse of the bit rate in giga bits per second.

Figure 3C:
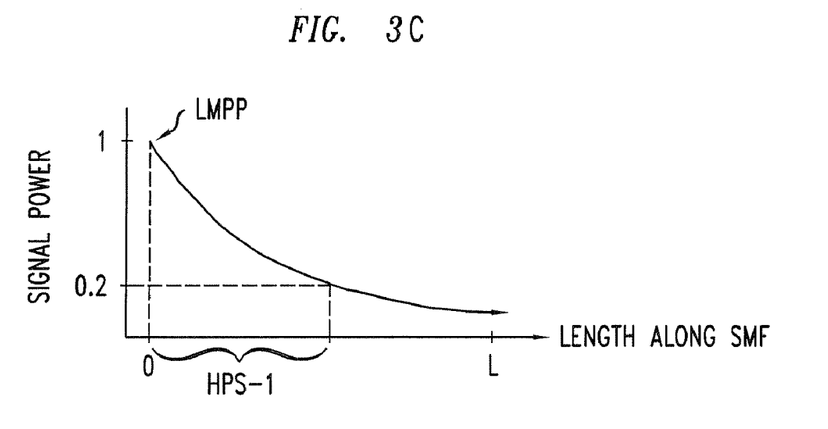
FIG. 3C illustrates power evolution of an optical signal as the signal propagates along a transmission span of single-mode optical fiber in an embodiment that relies on erbium doped fiber (EDF) amplification.
Figure 3D:
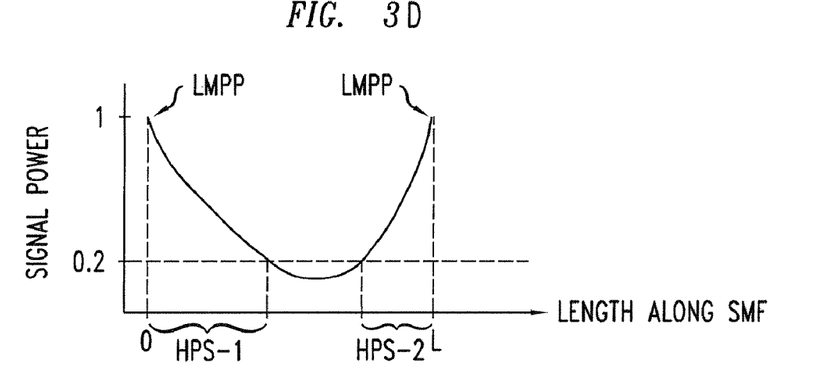
FIG. 3D illustrates power evolution of an optical signal as the signal propagates along a transmission span of single-mode optical fiber in an embodiment that relies on backwards Raman amplification.
Figure 3E:
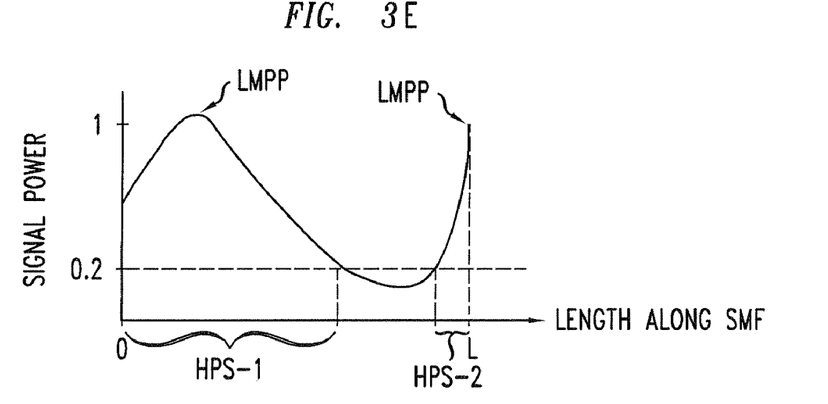
FIG. 3E illustrates power evolution of an optical signal as the signal propagates along a transmission span of single-mode optical fiber in an embodiment that relies on combined forward and backwards Raman amplification.

FIGS. 3C-3E illustrate the above-described high optical power segments (HPSs) and local maximum power points (LMPPs) at the selected wavelength. The illustrated spans 26 of FIGS. 3C-3E have SMFs of length, L, and use different amplification schemes. The amplification schemes are EDFA, backward Raman, and combined forward and backward Raman amplification, respectively. In the various cases, the SMF has one or two local maximum power points at the selected signal wavelength. For many amplification schemes, the integral of the signal optical power over a segment of the path is larger if the segment is near the signal input of a transmission span than if the segment is near the signal output of the span. For example, in FIG. 3D, the optical power integrated along the high power segment (HPS-1) near the input of the SMF is larger than the optical power integrated along the other high power segment (HPS-2) of the same SMF. Thus, nonlinear effects from the high power segment (HPS-1) close to the input of the fiber are typically more important than such effects from any other high power segment (HPS-2) therein. Therefore, at primary local maximum power points of SMFs of the sequence of spans 26, magnitudes of cumulative dispersions of the optical data signals in pico seconds per nanometer are desirably less than 32,000 times the inverse of the bit rate in giga bits per second. At the selected wavelength, the primary local maximum power point of a span 26 is the local maximum power point of the associated SMF that is located nearest the input to the SMF. Preferably, at said primary local maximum power points, cumulative dispersions are also less than 16,000 times the inverse of the bit rate in giga bits per second.

Herein, for optical pulses, cumulative dispersions are defined by the evolution of pulse widths and for phase modulations of an optical carrier, are defined by the evolution of distances between adjacent phase modulations of the carrier.

For some embodiments of the above process, in said segments, cumulative dispersions of the digital optical data signals in pico seconds per nanometer at said points may remain less than about 16,000 times the inverse of the bit rate in giga bits per second. The streaming digital optical signals and transporting of said optical signals may be in a pseudo-linear transmission regime (PLTR). Since typical embodiments of long haul, all-optical, communication path 20 incorporate transmission spans 26 of PDSMF, these optical communication paths 20 can be implemented as a relatively inexpensive improvement to many deployed long-haul optical communication paths. In particular, implementing such an improvement would not typically involve the replacement of already deployed optical transmission spans. Instead, implementation would involve replacing dispersion compensators, e.g., compensators 30, 34, 38. The dispersion compensators are lumped devices, which are more readily accessed and replaced than deployed optical fiber of long transmission spans. For that reason, such improvements should be much less costly than improvements that involve replacing the optical transmission spans themselves. Implementing various embodiments of optical path 20 as improvements to deployed systems should, e.g., be much less costly than replacing deployed transmission spans of non-hybrid optical fiber with hybrid optical fibers. Herein, a hybrid optical fiber is an optical fiber that is formed of an alternating sequence of segments of positive dispersion optical fiber and segments of negative dispersion optical fiber.

Recent simulation-based studies account better for intrachannel interactions between long trains of optical pulses than simulations of earlier studies. Earlier studies typically simulated well interactions between short random sequences of optical pulses, but did not faithfully simulate interactions between long pseudo-random sequences of optical pulses. The recent studies more faithfully simulate interactions between long random sequences of optical pulses. The results of these studies indicate that dispersion maps with low total excursion have advantages over maps with large total excursion.

The results of other recent studies indicate that non-singly periodic dispersion maps have advantages over singly periodic dispersion maps having comparable total excursions.

Herein, the total excursion is the maximum value in a particular set. The set's members are the magnitude(s) of the difference(s) between the cumulative dispersion at the local maximum optical power point(s) of one span of transmission fiber and the cumulative dispersion at the local maximum optical power point(s) of another span of transmission fiber. The set includes value(s) for said magnitude(s) for all pairs of different spans of the associated optical communication path.

Figure 6:
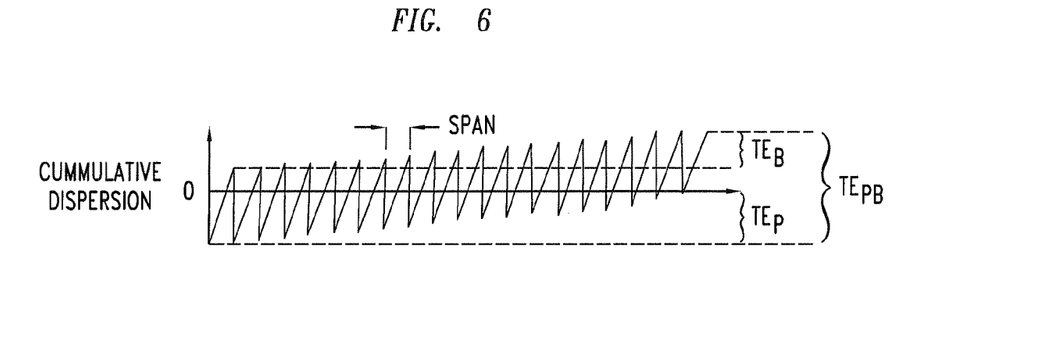
FIG. 6 shows a low total excursion, singly periodic dispersion map that may be incorporated into the optical communication path of FIG. 3.

The definition of the one or more local maximum optical power points of a transmission fiber depends on the amplification scheme for the span. If the optical pulses are optically amplified prior to the transmission fiber of a span, e.g., via rare-earth amplification or forward Raman optical amplification, a single local maximum power point is located at or near the "input" end of the transmission fiber. If the optical pulses are backward Raman optically amplified along the transmission fiber of a span, a single local maximum power point is at the "output" end of the transmission fiber. If the optical pulses are both optically amplified prior to the transmission fiber of a span and backward Raman optically amplified along the transmission fiber, the transmission fiber has two local maximum power points; one is located at the "input" end of the fiber and one is located at the "output" end of the transmission fiber. FIG. 6 illustrates the total excursion for various optical amplification schemes. In the cases where optical amplification is prior to transmission to each transmission fiber, optical amplification is backward along each transmission fiber, and optical amplification is both prior to transmission to each transmission fiber and backward along each transmission fiber, the total excursion is given by $TE_P$, $TE_B$, and $TE_{PB}$, respectively, as shown in FIG. 6.

Figure 5A:
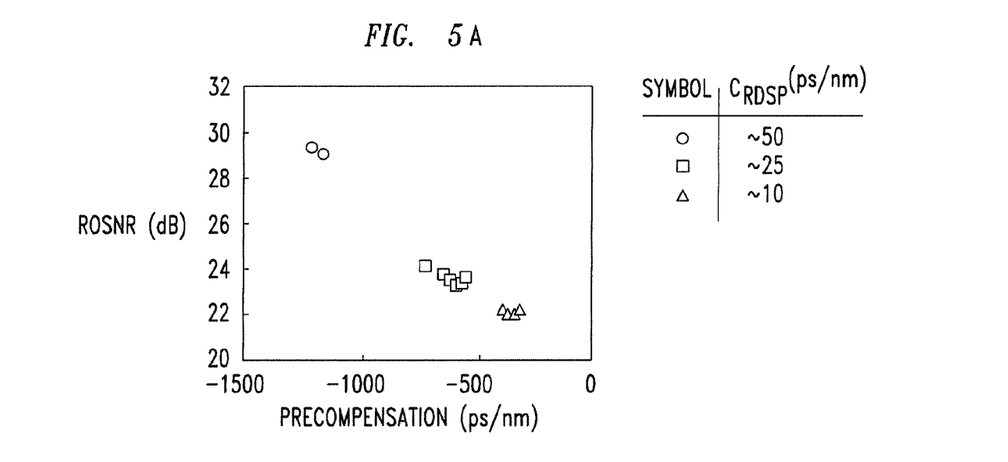
FIG. 5A plots predictions for the required optical signal to noise ratios (ROSNRs) needed for a bit error rate of $10^{-9}$ during single channel operation of an optical communication path with a singly periodic dispersion map.
Figure 5B:
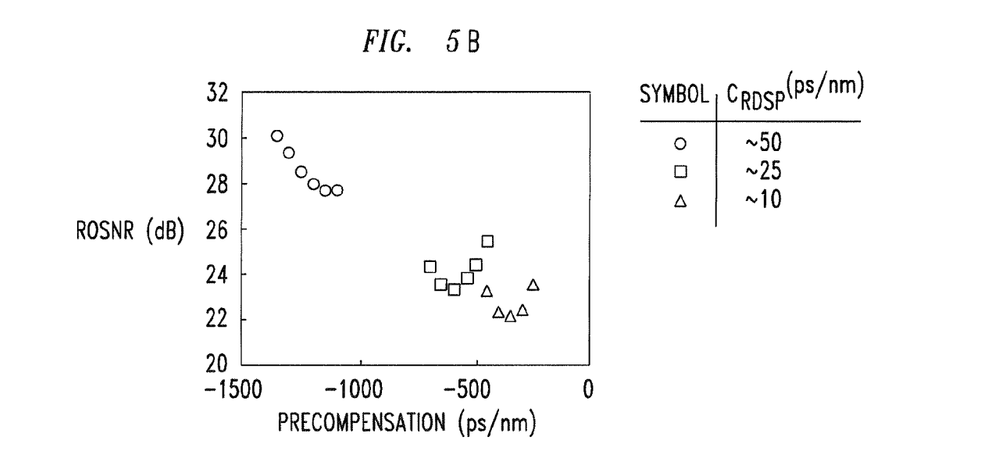
FIG. 5B plots predictions for the ROSNRs needed for a bit error rate of $10^{-9}$ during dense wavelength division multiplexed (DWDM) operation of an optical communication path with a singly periodic dispersion map.

FIGS. 5A and 5B plot simulated predictions for values of the ROSNR that are needed to obtain a preselected bit error rate (BER) of $10^{-9}$ at a bit rate of 40 Gb/s. FIG. 5A and FIG. 5B show the ROSNR values obtained for an exemplary optical communication path 20 in a single channel mode and in a dense wavelength-division multiplexed (DWDM) mode, respectively. The simulated values are based on an optical communication path 20 with twenty-eight identical transmission spans 26, wherein each transmission span 20 includes 80 kilometers (km) of standard single mode optical fiber (SSMF), i.e., PDSMFs. The simulations assumed that each SSMF had a dispersion of 17 ps/[(nm) (km)], a dispersion slope of 0.055 ps/[(nm$^2$) (km)], a loss coefficient of 0.2 dB/km, and a nonlinear coefficient $\gamma$ of 1.22/[(watt) (km)]. The simulations also assumed that the optical communication path 20 has a singly periodic dispersion map in which $C_{PRE}$ has been optimized in terms of $C_{RDPS}$ as already described herein. The simulated optical communication path 20 has in-line amplifiers 28 that operate as EDFAs and that introduce negligible nonlinear optical effects, i.e., due to assumed low power levels therein. The simulations used a De Bruijn bit sequence (DBBS) to simulate pseudo-random intra-channel interactions between sequences of optical pulses. The plotted ROSNR values were obtained from DBBSs that substantially reproduce intra-channel inter-pulse interactions for pseudo-random sequences with as many as 11 bits.

FIGS. 5A and 5B show simulated values of the ROSNR for different regimes of $C_{RDPS}$. Herein, the ROSNR is the minimum optical signal to noise ratio that is needed to obtain transmission with no more than a preselected bit error rate. The different values of $C_{RDPS}$ lead to different values for the $C_{PRE}$ that optimizes the singly periodic map. The different simulated regimes correspond to values of $C_{RDPS}$ near 50 ps/nm, 25 ps/nm, and 10 ps/nm, respectively and are shown by respective circular, square, and triangular data points in FIGS. 5A and 5B. In both the single frequency-channel mode and the DWDM mode, the values for the ROSNR are several dB lower for $C_{RDPS}$ values near the lower 25 ps/nm values than for the $C_{RDPS}$ values near 50 ps/nm. In the single channel mode, the values for the ROSNR are also about 2 dB lower for the lower $C_{RDPS}$ values near 10 ps/nm than for the $C_{RDPS}$ values near 25 ps/nm. For the singly periodic map, the low $C_{PRE}$ values correspond to dispersion maps having low total excursions. Since maps having low total excursions need lower ROSNRs, such maps require less optical power to produce a selected BER.

In embodiments of optical communication path 20 of FIG. 3A, nonlinear optical effects will also degrade optical pulses in a manner that depends on the total excursion. The dependence of such degradation on the total dispersion may be related to bit rates. High bit rates produce frequency components that undergo large time shifts while propagating through the optical communication path. The large time shifts produce interactions between long sequences of optical pulses and should grow with the total excursion of the dispersion map. For that reason, the required optical signal to noise ratios (ROSNR) should probably also increase with the total excursion.

For these reasons, other dispersion maps with low total excursions should require lower ROSNR values for desired BERs than dispersion maps with higher total excursions. In various embodiments with low total excursion, the magnitude of the cumulative dispersion is low and below a preselected maximum value at all locally maximum power points of transmission spans 26 of FIG. 3A. The preselected maximum value for the magnitude of the cumulative dispersion in pico seconds per nanometer is preferably about 32,000-16,000 times the inverse of the bit rate in giga bits per second or preferably about 16,000 or less times the inverse of the bit rate in giga bits per second. For a bit rate of 40 giga bits per second, this produces a maximum total excursion of about 400 to 800 pico seconds per nanometer.

For dispersion maps having a nonzero $C_{RDPS}$, a low total excursion often implies that substantial numbers of local maximum optical power points of the spans of transmission fiber have negative cumulative dispersions and substantial numbers of such points will have positive cumulative dispersions. For example, in some embodiments, the most negative cumulative dispersion at any local maximum optical power point of a span of transmission fiber is about equal to negative one times the most positive cumulative dispersion at any such point. For various embodiments, the map ratio is preferably near one, e.g., the map ratio may be in the range of about 0.5 to 2.0. Herein, the map ratio is defined as the sum of positive cumulative dispersion values at local maximum optical power points to the sum of the magnitudes of the negative cumulative dispersion values at local maximum power points.

Figure 7:
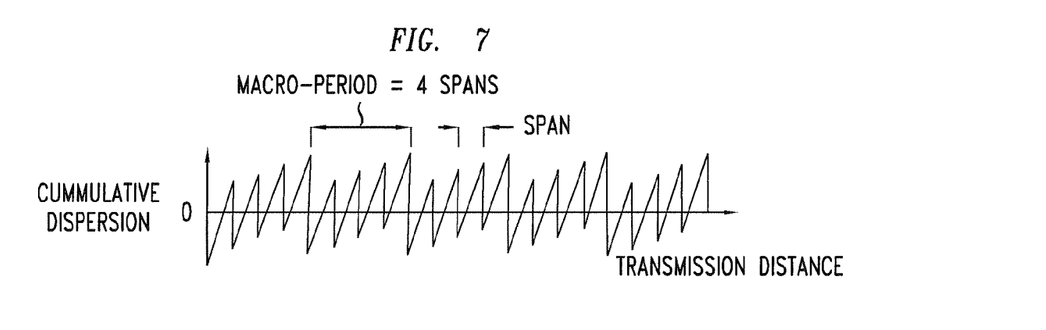
FIG. 7 shows a low total excursion, doubly periodic dispersion map that is incorporated into some embodiments of the optical communication path of FIG. 3.
Figure 8:
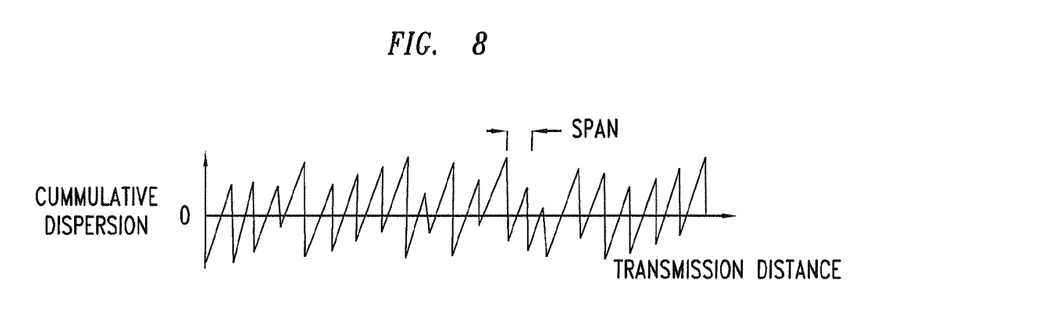
FIG. 8 shows a low total excursion, dispersion map of non-definite periodicity that is incorporated into some embodiments of the optical communication path of FIG. 3.

FIGS. 6-8 show exemplary dispersion maps for the optical communication path 20 of FIG. 3A in which total excursions are low.

FIG. 6 shows a singly periodic dispersion map that has a low total excursion. For a singly periodic map, the total excursion is the magnitude of the sum of the largest cumulative dispersion at a local maximum optical power point of the last transmission span plus the negative of the most negative cumulative dispersion at a local maximum power point of the first transmission span. For many such maps with suitably low total excursion, the magnitude of the cumulative dispersion at such points should be about 32,000-16,000 or less ps/nm times the inverse of the bit rate in Gb/s. At a bit rate of 40 Gb/s, the magnitude of the cumulative dispersion at these points is thus, about 800-400 ps/nm or less.

FIG. 7 shows a doubly periodic dispersion map that has low total excursion, e.g., a map of an embodiment of optical communication path 20 of FIG. 3A. In the doubly periodic map, $C_{RDPS}$'s of some transmission spans take positive values, and $C_{RDPS}$'s of other transmission spans take negative values. Also, in such a map, the cumulative dispersion oscillates in a manner that is periodic in the number of spans. This macro-oscillation period that defines the periodicity in a doubly periodic map is equal to a number of transmission spans, wherein the number is larger than one and smaller than the total number of transmission spans in the optical communication path. For many doubly periodic maps, the total excursion is about equal to the difference between the cumulative dispersion at a maximum optical power point in a last transmission span of such a macro-oscillation cycle minus the cumulative dispersion at a maximum optical power point in the first transmission span of the same macro-oscillation cycle. In embodiments with doubly periodic maps of low excursion, the maximum magnitude of the cumulative dispersion at local maximum optical power points of transmission spans is typically about 32,000-16,000 ps/nm times the inverse of the bit rate in Gb/s and is preferably about 16,000 or less ps/nm times the inverse of the bit rate in Gb/s. For a bit rate of 40 Gb/s, the magnitude of the cumulative dispersion at these points is about 800-400 ps/nm or less.

FIG. 8 shows a dispersion map of non-definite periodicity and low total excursion, e.g., a map of another embodiment of optical communication path 20 of FIG. 3A. In a dispersion map of non-definite periodicity, $C_{RDPS}$'s of some transmission spans take positive values, and $C_{RDPS}$'s of other transmission spans take negative values. Also, in such maps, the cumulative dispersion oscillates between the various values in a manner that is not periodic over any integral number of transmission spans smaller than the total number of such spans in the optical communication path. Often, in such dispersion maps, the sign of the $C_{RPSD}$ also varies in a manner that is not periodic with any number of transmission spans that is less than the total number of transmission spans in the optical communication path. In various embodiments having a map of non-definite periodicity and low excursion, the maximum magnitude of the cumulative dispersion at local maximum optical power points of transmission spans is typically about 32,000-16,000 ps/nm times the inverse of the bit rate in Gb/s and is preferably about 16,000 ps/nm or less times the inverse of the bit rate in Gb/s. For a bit rate of 40 Gb/s, the magnitude of the cumulative dispersion at these points is about 800-400 ps/nm or less.

Typically, a large cumulative dispersion at local maximum optical power points of a few of the transmission spans should not eliminate the advantage of low cumulative dispersion for the entire optical communication path. The pulse distortion produced by nonlinear optical effects at a few such points might not be large if the path has many transmission spans. Thus, the embodiments of FIGS. 7 and 8 are intended to also cover optical communication paths and optical transmission methods, wherein cumulative dispersions at only a portion of the local maximum optical power points of transmission fibers satisfy the above-described limits. In particular, about 80 percent or more and preferably about 90 percent or more of a path's transmission fibers should have local maximum optical power points where the cumulative dispersion is about 32,000-16,000 ps/nm or less times the inverse of the bit rate in Gb/s. More preferably, the 80% or more and preferably 90% or more of such transmission fibers should be such that the cumulative dispersion at local maximum optical power points therein is less than about 16,000 ps/nm times the inverse of the bit rate in Gb/s.

Among the dispersion maps useable in optical communication paths, the singly periodic map has undesirable properties for long haul paths. In particular, the singly periodic map produces a large eye closure penalty for transmitted pulses. The eye closure penalty is the ratio of the height of a transmitted optical pulse's eye to the height of a received optical pulse's eye averaged over an ensemble of such received pulses. Eye closure penalties are typically given in decibels (dB).

Figure 9:
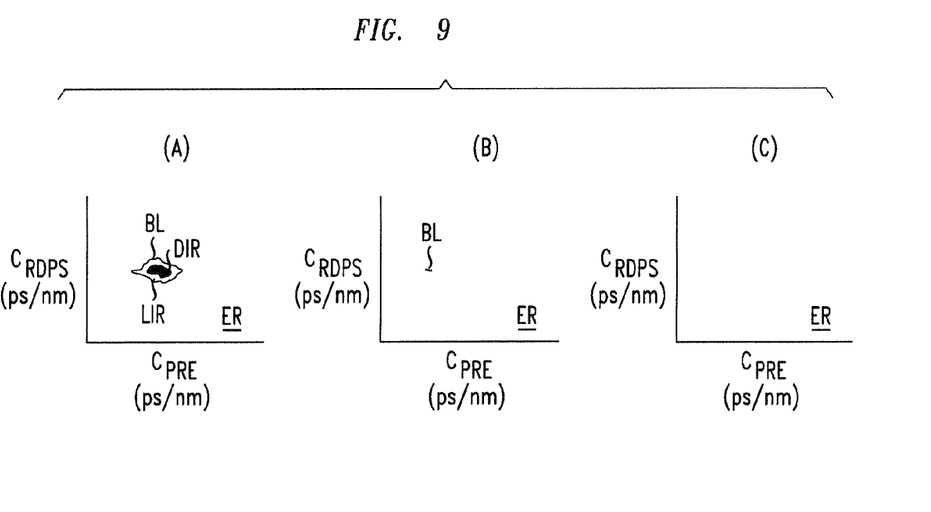
FIG. 9 illustrate eye closure penalties for optical communication paths according to FIG. 3 for a singly periodic dispersion map.
Figure 10:
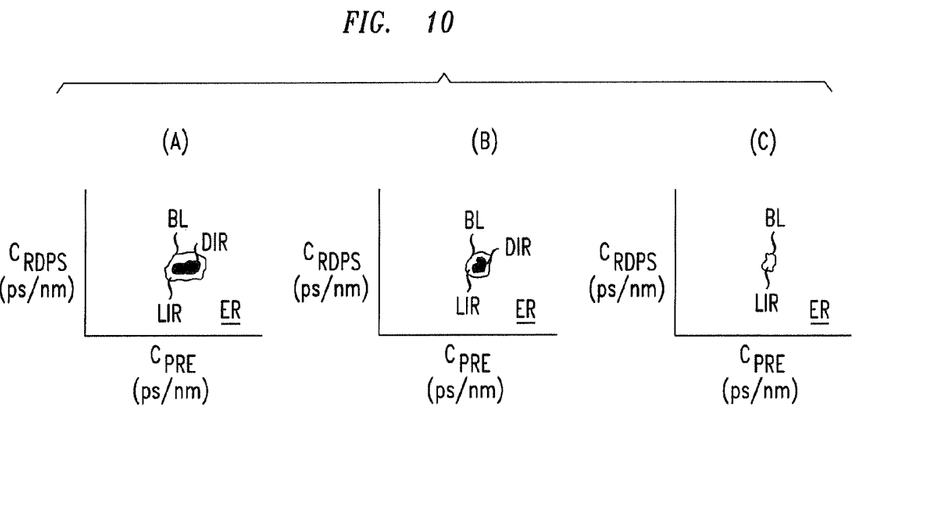
FIG. 10 illustrates eye closure penalties for an embodiment of the optical communication path of FIG. 3, which has a doubly periodic dispersion map.

FIGS. 9 and 10 show simulated DWDM transmission results for an optical communication path similar to path 20 of FIG. 3A except in the total number of transmission spans. The simulated results of FIG. 9 and FIG. 10 correspond to dispersion maps that are singly periodic and doubly periodic, respectively. The simulations of FIGS. 9 and 10 are based on transmission parameters: RZ optical pulses, a data rate of 40 Gb/s per channel, a 33% duty cycle, a 100 giga hertz channel spacing, and 0 dB input power per channel. The simulations are also based on the system parameters: a fiber dispersion of 4 ps per nm per km, a dispersion slope of 0.07 ps/nm$^2$ per km, a fiber loss of 0.23 dB per km, an optical non-linearity coefficient $\gamma$ of 1.84 per watt per km, lumped and noiseless optical amplifiers, span lengths of 100 km, and a receiver having a 4$^{th}$ order Bessel filter with an optical bandwidth of 80 GHz and an electrical bandwidth of 30 GHz.

FIGS. 9-10 illustrate eye closure penalties for various values of $C_{RPSD}$ and $C_{PRE}$. Plates A, B, and C illustrate the eye closure penalty for path lengths of 1,000 kilometers (km), 2,000 km, and 3,000 km, respectively. In the plates A, B, C, the white external regions "ER", dark boundary lines "BL", light internal regions "LIR", and dark internal regions "DIR" represent approximate eye closure penalties of: more than 6 dB, about 5-6 dB, about 3.5-5 dB, and about 0.5-3.5 dB, respectively.

A comparison of corresponding plates A-C of FIGS. 9 and 10 immediately evidences that long communication paths produce a smaller eye closure penalty if they use a doubly periodic dispersion map rather than the singly periodic dispersion map. In particular, for the 3,000 km long path, the doubly periodic path produces LIR regions in the $C_{RPSD}$ and $C_{PRE}$ space where the eye closure penalty is about 3.5-5 dB whereas the singly periodic map only produces ER regions where the eye closure penalty is greater than about 6 dB. Similarly, for the 2,000 km long path, the doubly periodic path produces DIR regions in the $C_{RPSD}$ and $C_{PRE}$ space where the eye closure penalty is about 0.5-3.5 dB whereas the singly periodic map only produces BL and ER regions where eye closure penalty is about 5 dB or larger. On the other hand, for the shorter 1,000 km long communication path and for signal power used here, both the singly and doubly periodic dispersion maps produce the DIR regions in the $C_{RPSD}$ and $C_{PRE}$ space where the eye closure penalty is relatively small, i.e., in the range of about 0.5-3.5 dB.

The results of FIGS. 5A, 5B evidence that doubly periodic dispersion maps with a low total excursion have advantages over dispersion maps with a high total excursion. The results of FIGS. 9 and 10 evidence that doubly periodic maps also have advantages over singly periodic dispersion maps with comparably low total excursion for long communication paths. In some embodiments of optical communication path 20 of FIG. 3A, doubly periodic maps have low total excursions and communication paths are long, e.g., total path lengths are more than 1,000 km and preferably are about 2,000 km or more. Embodiments of optical communication path 20 in which the dispersion map has a non-definite periodicity and a low total excursion may also have advantages. Some embodiments with such dispersion maps also have long communication paths, e.g., total path lengths of more than 1,000 km and preferably of about 2,000 km or more.

From the disclosure, drawings, and claims, other embodiments of the invention will be apparent to those skilled in the art.

What is claimed is:

1. A process for optically transporting digital data over an all-optical long-haul communication path, comprising:
    transporting digital optical data signals at a selected bit rate and a selected wavelength over a sequence of transmission spans including 70 percent or more of the spans of the long-haul all-optical communication path, each span being configured to have one or more local maximum optical power points at the selected wavelength on a transmission fiber thereof, the transporting causing a cumulative dispersion of each transported optical signal to evolve such that residual dispersions per span over some ones of the spans are positive and such that residual dispersions per span over other ones of the spans are negative;
    wherein for each span, a primary local maximum power point at the selected wavelength is the one of the local maximum power points nearest to a signal input in the associated one of the fibers; and
    wherein at the primary local maximum power point of each span of the sequence, magnitudes of cumulative dispersions of the digital optical data signals in pico seconds per nanometer are less than 32,000 times the inverse of the bit rate in giga bits per second.

2. The process of claim 1, wherein each transmission fiber is a non-hybrid optical fiber and each transmission span of the sequence includes a dispersion compensator cascaded with the transmission fiber of the same span.

3. The process of claim 1, wherein the transporting comprises transporting optical pulses in a pseudo-linear transmission regime.

4. The process of claim 3, wherein at the primary local maximum power point at the wavelength of each span of the sequence, cumulative dispersions of the digital optical data signals in pico seconds per nanometer are less than 16,000 times the inverse of the bit rate in giga bits per second.

5. The process of claim 3, wherein the selected bit rate is 20 giga bits per second or higher; and wherein a portion of the transmission fibers have lengths of 80 kilometers or more.

6. The process of claim 3, wherein the digital optical data signals are optical pulses.

7. The process of claim 3, wherein the dispersion map has a non-definite periodicity or is doubly periodic.

8. The process of claim 6, wherein a combined length of the transmission fibers of the optical communication path is 2,000 kilometers or more.

9. In a long-haul optical communication system for transmitting digital optical data signals at a selected bit rate and a selected wavelength, an apparatus comprising:
    a sequence of optical transmission spans that form at least 70 percent of the spans of the long-haul all-optical communication path, each span of the sequence having a transmission single-mode optical fiber, an optical amplifier, and a dispersion compensator; and
    wherein the path causes cumulative dispersions of the digital optical data signals to evolve such that residual dispersions per span over some ones of the spans are positive for the selected wavelength and over other ones of the spans are negative for the selected wavelength; and
    wherein the path is configured to produce one or more local maximum optical power points for the selected wavelength in each transmission optical fiber, for the selected wavelength the local maximum power point nearest to the signal input of one of the fibers is the primary local maximum power point of the associated span; and
    wherein the path is configured such that at the primary local maximum power points of the spans in the sequence, magnitudes of cumulative dispersions of the optical data signals in pico seconds per nanometer are less than 32,000 times the inverse of the bit rate in giga bits per second.

10. The apparatus of claim 9, wherein the dispersion map is one of a doubly periodic map and a map having a non-definite periodicity.

11. The apparatus of claim 9, wherein the transmission single mode optical fibers have positive dispersion.

12. The apparatus of claim 10 wherein a combined length of transmission fibers of the optical communication path is 2,000 kilometers or more.

13. The apparatus of claim 9, wherein the map is doubly periodic and the combined length of transmission fibers of the optical communication path is 2,000 kilometers or more.

14. The apparatus of claim 9, wherein each transmission fiber is a non-hybrid transmission optical fiber.

15. The apparatus of claim 10, further comprising the transmitter, the transmitter being configured to transmit optical pulses in a pseudo-linear transmission regime.

* * * * *